US007388519B1

(12) United States Patent
Kreft

(10) Patent No.: US 7,388,519 B1
(45) Date of Patent: Jun. 17, 2008

(54) DISPLAYING POINTS OF INTEREST WITH QUALITATIVE INFORMATION

(76) Inventor: Keith A. Kreft, 10843 Wilkinson Ave., Cupertino, CA (US) 95014

( * ) Notice: Subject to any disclaimer, the term of this patent is extended or adjusted under 35 U.S.C. 154(b) by 217 days.

(21) Appl. No.: 10/897,905

(22) Filed: Jul. 22, 2004

Related U.S. Application Data

(60) Provisional application No. 60/488,784, filed on Jul. 22, 2003.

(51) Int. Cl.
    G08G 1/123     (2006.01)
    G01C 21/00     (2006.01)
(52) U.S. Cl. ............................. 340/995.24; 340/995.1; 340/995.11; 340/995.12; 340/995.14; 340/995.17; 701/207; 701/211
(58) Field of Classification Search ................ None
    See application file for complete search history.

(56) References Cited

U.S. PATENT DOCUMENTS

| 4,570,227 | A | 2/1986 | Tachi et al. |
| 4,737,927 | A | 4/1988 | Hanabusa et al. |
| 4,761,742 | A | 8/1988 | Hanabusa et al. |
| 4,972,319 | A | 11/1990 | Delorme |
| 5,353,034 | A | 10/1994 | Sato et al. |
| 5,470,233 | A | 11/1995 | Fruchterman et al. |
| 5,559,707 | A | 9/1996 | DeLorme et al. |
| 5,794,164 | A | 8/1998 | Beckert et al. |
| 5,802,492 | A | 9/1998 | DeLorme et al. |
| 5,832,408 | A | 11/1998 | Tamai et al. |
| 5,848,373 | A | 12/1998 | DeLorme et al. |
| 5,930,474 | A | 7/1999 | Dunworth et al. |
| 5,948,040 | A | 9/1999 | DeLorme et al. |
| 6,009,403 | A | 12/1999 | Sato |
| 6,085,148 | A | 7/2000 | Jamison et al. |
| 6,092,076 | A | 7/2000 | McDonough et al. |
| 6,118,404 | A | 9/2000 | Fernekes et al. |
| 6,202,023 | B1 | 3/2001 | Hancock et al. |
| 6,240,360 | B1 | 5/2001 | Phelan |
| 6,266,614 | B1 | 7/2001 | Alumbaugh |
| 6,278,938 | B1 | 8/2001 | Alumbaugh |
| 6,278,940 | B1 | 8/2001 | Endo |
| 6,282,489 | B1 | 8/2001 | Bellesfield et al. |
| 6,308,177 | B1 | 10/2001 | Israni et al. |
| 6,321,158 | B1 | 11/2001 | DeLorme et al. |
| 6,323,885 | B1 | 11/2001 | Wiese |
| 6,336,073 | B1 | 1/2002 | Ihara et al. |

(Continued)

OTHER PUBLICATIONS

Microsoft Corporation. (2003). *Microsoft Streets & Trips 2004.* pp. 1-12.

(Continued)

*Primary Examiner*—Julie Lieu
(74) *Attorney, Agent, or Firm*—Hickman Palermo Truong & Becker LLP

(57) ABSTRACT

A method is disclosed for associating and displaying qualitative information with points of interest in a graphical map. In one embodiment, a method comprises the computer-implemented steps of displaying a geographical map; displaying in the map, concurrently, icons identifying one or more points of interest at graphical locations in the map corresponding to geographical locations of the points of interest; and concurrently displaying, over the map, for each of the points of interest, qualitative information associated with the associated point of interest. Each of the points of interest is associated with one or more datasets, and different qualitative information is displayed for different datasets.

20 Claims, 8 Drawing Sheets

U.S. PATENT DOCUMENTS

| | | |
|---|---|---|
| 6,336,111 B1 | 1/2002 | Ashby et al. |
| 6,345,266 B1 | 2/2002 | Ganguly et al. |
| 6,356,834 B2 | 3/2002 | Hancock et al. |
| 6,374,180 B1 | 4/2002 | Slominski et al. |
| 6,401,034 B1 | 6/2002 | Kaplan et al. |
| 6,405,123 B1 | 6/2002 | Rennard et al. |
| 6,405,129 B1 | 6/2002 | Yokota |
| 6,408,307 B1 | 6/2002 | Semple et al. |
| 6,415,291 B2 | 7/2002 | Bouve et al. |
| 6,434,481 B2 | 8/2002 | Winter et al. |
| 6,434,482 B1 | 8/2002 | Oshida et al. |
| 6,442,475 B1 | 8/2002 | Utsui et al. |
| 6,456,932 B2 | 9/2002 | Yagyu |
| 6,473,692 B2 | 10/2002 | Hancock et al. |
| 6,484,094 B1 | 11/2002 | Wako |
| 6,487,495 B1 | 11/2002 | Gale et al. |
| 6,498,982 B2 | 12/2002 | Bellesfield et al. |
| 6,526,351 B2 | 2/2003 | Whitham |
| 6,529,143 B2 | 3/2003 | Mikkola et al. |
| 6,542,814 B2 | 4/2003 | Polidi et al. |
| 6,542,817 B2 | 4/2003 | Miyaki |
| 6,553,310 B1 | 4/2003 | Lopke |
| 6,571,169 B2 | 5/2003 | Miyaki |
| 6,577,714 B1 | 6/2003 | Darcie et al. |
| 6,580,375 B2 | 6/2003 | Ruhl |
| 6,587,782 B1 * | 7/2003 | Nocek et al. ............... 701/200 |
| 6,587,787 B1 * | 7/2003 | Yokota ....................... 701/212 |
| 6,604,046 B1 | 8/2003 | Van Watermulen et al. |
| 6,640,187 B1 | 10/2003 | Chenault et al. |
| 6,677,894 B2 | 1/2004 | Sheynblat et al. |
| 2002/0054134 A1 | 5/2002 | Kelts |
| 2002/0112237 A1 * | 8/2002 | Kelts ........................... 725/39 |
| 2002/0130906 A1 * | 9/2002 | Miyaki ....................... 345/837 |
| 2003/0069693 A1 * | 4/2003 | Snapp et al. ................. 701/213 |
| 2004/0008225 A1 * | 1/2004 | Campbell .................... 345/764 |
| 2005/0251331 A1 * | 11/2005 | Kreft ........................... 701/207 |

OTHER PUBLICATIONS

Esri. (1999-2003). *BusinessMAP Travel Edition User's Guide, Version 2.0.* pp. 1-79.

The Apache Software Foundation. (1999-2000). *Street Atlas USA 2004 Plus User Guide.* pp. 1-181.

The Apache Software Foundation. (1999-2000). *Street Atlas USA 2003 Plus User Guide.* pp. 1-141.

USPTO, PCT International Search Report and transmittal, Feb. 26, 2007, pp. 1-6, USPTO, Alexandria, Virginia.

USPTO, PCT Written Opinion of the International Searching Authority, Feb. 26, 2007, pp. 1-7, USPTO, Alexandria, Virginia.

\* cited by examiner

DISPLAYING POINTS OF INTEREST WITH QUALITATIVE INFORMATION

CROSS-REFERENCE TO RELATED APPLICATIONS; PRIORITY CLAIM

This application claims benefit of Provisional Appln. 60/488,784, filed Jul. 22, 2003, the entire contents of which is hereby incorporated by reference as if fully set forth herein, under 35 U.S.C. §119(e).

FIELD OF THE INVENTION

The present invention generally relates to information display systems. The invention relates more specifically to information systems that display geographical maps.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Travel map software programs for use with personal computers are useful for locating places and points of interest when the addresses of the places and points of interest are known. Such programs also can provide driving or routing directions between identified locations. The industry has seen a major emphasis placed on tying GPS sensors into these programs to provide the user with in-vehicle navigation information. However, both the PC-based and the in-vehicle navigation programs are poorly suited for locating points of interest when either the specific street address, or the exact name of the place of interest, is unknown.

For example, in many systems, points of interest can only be seen, or be fully identified, by zooming in to view the map at a street level and scouring the map for the points. The points of interest either disappear or loose recognizable characteristics if the map is viewed at higher, zoomed-out, levels. Unfortunately, this approach is extremely tedious to use for identifying a particular points of interest. For example, a user seeking a particular category of restaurant, without knowing the specific street address or exact name, may have to view dozens of streets at a fine level of detail before concluding that the locality does not have a restaurant in the category.

Many existing the map programs provide search functions. With the search functions, a user can look for a point of interest based on a portion of the complete name of the points of interest, without providing or knowing the full street address. For example, a search query of the form "STARBUCKS" will yield a list of locations of Starbucks coffee houses. However, such searches often can yield a long listing of stores, restaurants or other matching points of interest consisting of the name of each point of interest and a street address at which the point is located. Often these are listed alphabetically. If the user is familiar with the geographic area of interest to the user, then the user might recognize the location of one of the points in the list. If the user is unfamiliar or visiting a particular geographic area, thought, then the user may be unable to determine whether a particular point of interest in the list is close to the user's location. Browsing though the list, selecting one of the listings, displaying a map that contains the selected point, and determining if the region around the point is familiar or can be located, can be a time consuming and frustrating ordeal.

An additional problem with current map systems is that they do not provide qualitative information about certain kinds points of interest. For some points of interest, additional information can be very helpful in qualifying whether a visit or further investigation is appropriate. For example, consider golf courses. Knowing the type of course (e.g., public or private), the number of holes, the fees, the degree of difficulty, etc., is essential in deciding whether to play a particular course. Having a map display that shows only the course name, address and phone number (termed "telephone book information" or "white pages information" herein), does not provide enough information to make an informed decision on whether to further pursue a candidate point of interest.

No currently available map programs do a respectable job locating golf courses. One reason is that golf course names do not follow any particular naming convention. A course name may contain the words "golf course," "golf club," "country club," etc. Some country clubs do not have a golf course. In addition, golf course addresses are often vanity addresses, e.g., One Golf Club Drive. Many of these addresses refer to private roads that are not mapped and do not appear on geo-coded systems that are used in the map programs.

Other kinds of points of interest are difficult to locate using current map programs because of the lack of qualitative information. For example, a mapping program might be able to find the location of a vineyard or a winery, but the user must consult other resources to find the hours of operation, whether the location has wine tasting, whether a tasting charge applies, etc.

Based on the foregoing, there is a clear need for an improved travel mapping program that can quickly deliver enhanced Point of Interest (POI) information. It would be useful to have information beyond the name, address, and phone number data that are typically provided. There is also a need for a better, more effective means of locating points of interest, and the aforementioned enhanced information, eliminating timely and sometimes fruitless searches.

BRIEF DESCRIPTION OF THE DRAWINGS

The present invention is illustrated by way of example, and not by way of limitation, in the accompanying drawings in which.

DETAILED DESCRIPTION

Figure 1:
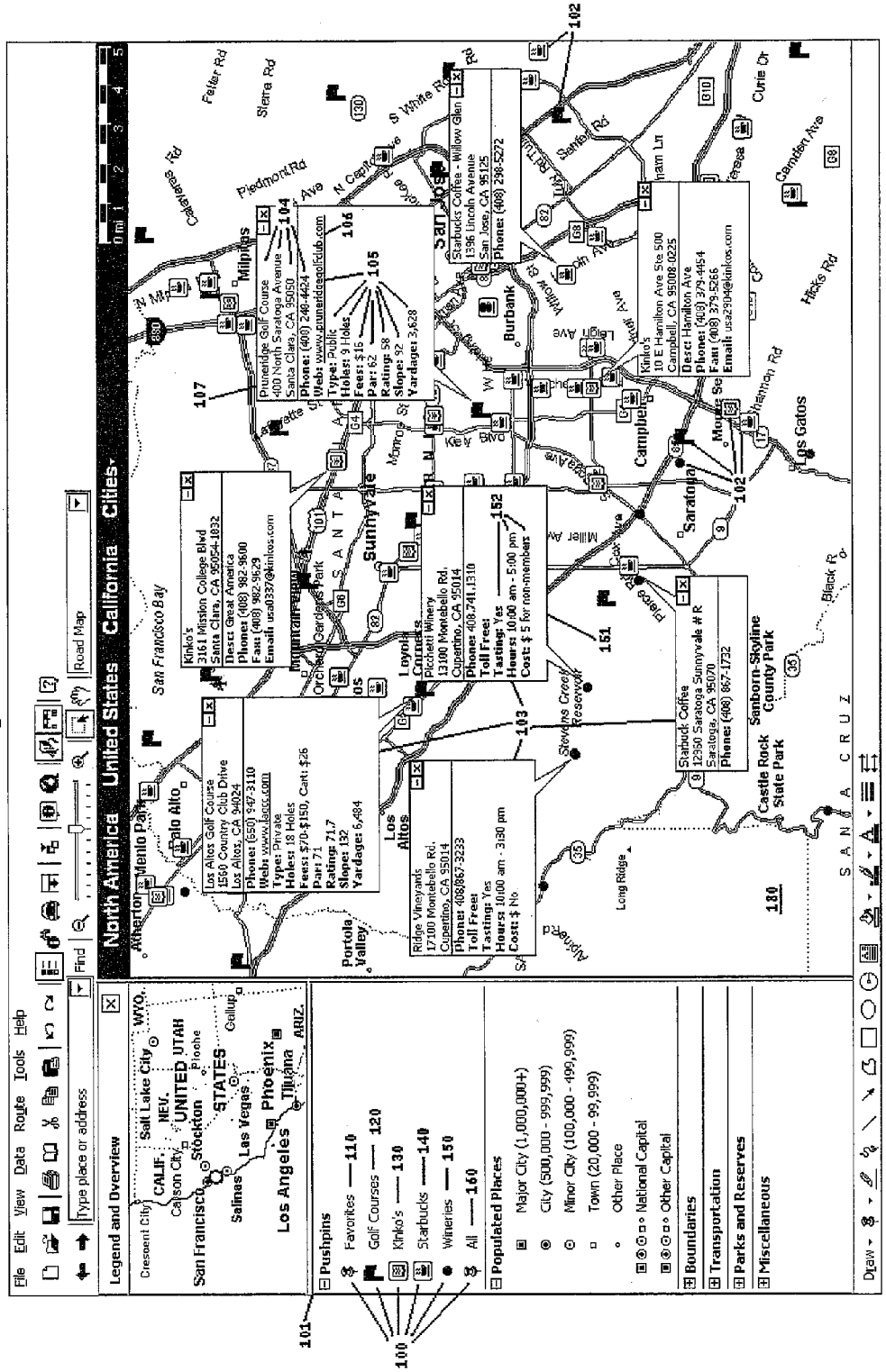
FIG. 1 is an example map diagram that may be displayed according to one embodiment, and showing varieties of points of interest, some with their information windows fully open, displaying examples of enhanced information.

Techniques for displaying points of interest with qualitative information are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternatives 1.0 General Overview The needs identified in the foregoing Background, and other needs and objects that will become apparent for the following description, are achieved in the present invention, which comprises, in one aspect, a method comprising the computer-implemented steps of displaying a geographical map; displaying in the map, concurrently, icons identifying one or more points of interest at graphical locations in the map corresponding to geographical locations of the points of interest; and concurrently displaying, over the map, for each of the points of interest, qualitative information associated with the associated point of interest; wherein each of the points of interest is associated with one or more datasets, and wherein different qualitative information is displayed for different datasets.

According to one feature, icons for two or more points of interest are concurrently displayed in the maps, and wherein qualitative information for all the points of interest is concurrently displayed in the map in association with the points of interest.

In another feature, the method further comprises receiving user input in association with a selected one of the points of interest, wherein the user input indicates a selection of one of a plurality of levels of information to display with the selected point of interest, wherein one of the levels of information comprises the qualitative information; and in response to receiving the user input, re-displaying a different level of information in association with the selected point of interest, wherein the level corresponds to the selection. In a related feature, the plurality of levels comprises all information including qualitative information, basic information only, and name only.

In yet another feature, the method includes associating a category name with a sub-set of the points of interest; receiving user input in association with the category name, wherein the user input indicates a selection of one of a plurality of levels of information to display with all points of interest in the subset; and in response to receiving the user input, re-displaying a different level of information in association with all points of interest in the subset, wherein the level corresponds to the selection. In still another feature, the qualitative information comprises any information, other than name, address or location, telephone number, and type of point of interest, that is useful to a user in determining whether to visit the point of interest, patronize the point of interest, or compare the point of interest to other similar points of interest.

Further, the category name may identify all the points of interest, and the sub-set may comprise all the points of interest. A plurality of category names may be organized and displayed in a hierarchical list of folders. The method may also feature receiving user input selecting a category name from a hierarchical list of category names.

In another feature, the method further involves creating and storing a list of user favorite points of interest; receiving user input identifying a particular point of interest as a user favorite; and associating the particular point of interest with the list of user favorite points of interest. In still another feature, the method provides for associating a favorites category name with the user favorite points of interest; receiving user input in association with the favorites category name, wherein the user input indicates a selection of one of a plurality of levels of information to display with all of the user favorite points of interest; and in response to receiving the user input, re-displaying a different level of information in association with all the user favorite points of interest, wherein the level corresponds to the selection.

In yet another feature, the method provides for associating a favorites category name with the user favorite points of interest; receiving user input in association with the favorites category name, wherein the user input requests discontinuing display of all the user favorite points of interest; and in response to receiving the user input, re-displaying the map without all the user favorite points of interest. The method may further involve re-displaying the map and displaying only the user favorite points of interest in the map.

In still another feature, the method includes receiving a search query; generating and displaying a result list of points of interest in response the search query; receiving user input identifying two or more selected points of interest that are selected from among the points of interest in the result list; and re-displaying the map, including concurrently displaying the selected points of interest identified by the user input. A related feature further involves creating and storing a dataset that contains the one or more selected points of interest, assigning a name to the dataset according to the search query, and displaying the name of the dataset in a hierarchical list of datasets.

In yet another feature, the qualitative information comprises any one or more of: ratings of users, reviewers, or media, pricing information, hours of operation, amenities, or hyperlinks to network resources associated with the points of interest. In still another feature, the qualitative information is displayed in an overlay balloon that provides qualitative information associated with the associated point of interest. Further, the steps may be performed as part of a travel or business mapping computer program.

In other aspects, the invention encompasses a computer apparatus and a computer-readable medium configured to carry out the foregoing steps.

2.0 Structural and Functional Overview

FIG. 1 shows an example screen display that may be generated by a mapping program that utilizes a method according to one embodiment. Point of Interest (POI) icons 100 are assigned to map location data sets shown in the left column 101. The data sets shown for the example map 180 include golf courses 120, Kinko's stores 130, Starbuck's coffee houses 140, and wineries 150. The locations of the points of interest are then displayed on the map as selectable icons 102. As point of interest icons are selected, information on each is presented 103 in information balloons on the map.

FIG. 1 shows a number of fully open information balloons 103, depicting the variety of information that might be provided. For example, in FIG. 1, Golf Course information 107 includes basic telephone book information 104 such as name of the course, address and phone number, and also useful qualitative or supplemental information 105 including the type of course (Private, Public, Military, Resort, Municipal, etc), the number of holes, cost (range of greens fees that are charged), course statistics such as Par, Rating, Slope, and Yardage, and a Website address 106. The qualitative information 105 also could contain additional useful information such as user ratings, an email address, the course designer, or information about course amenities (driving range, practice green, etc.). In this example, if the program is connected to the Internet, clicking on the website address 106 would connect the user to the golf course's listed web page.

FIG. 1 includes examples of other points of interest with qualitative. Supplemental information 152 for a winery 151 includes whether wine tasting is available, hours of operation and whether the winery charges for wine tasting.

Figure 2:
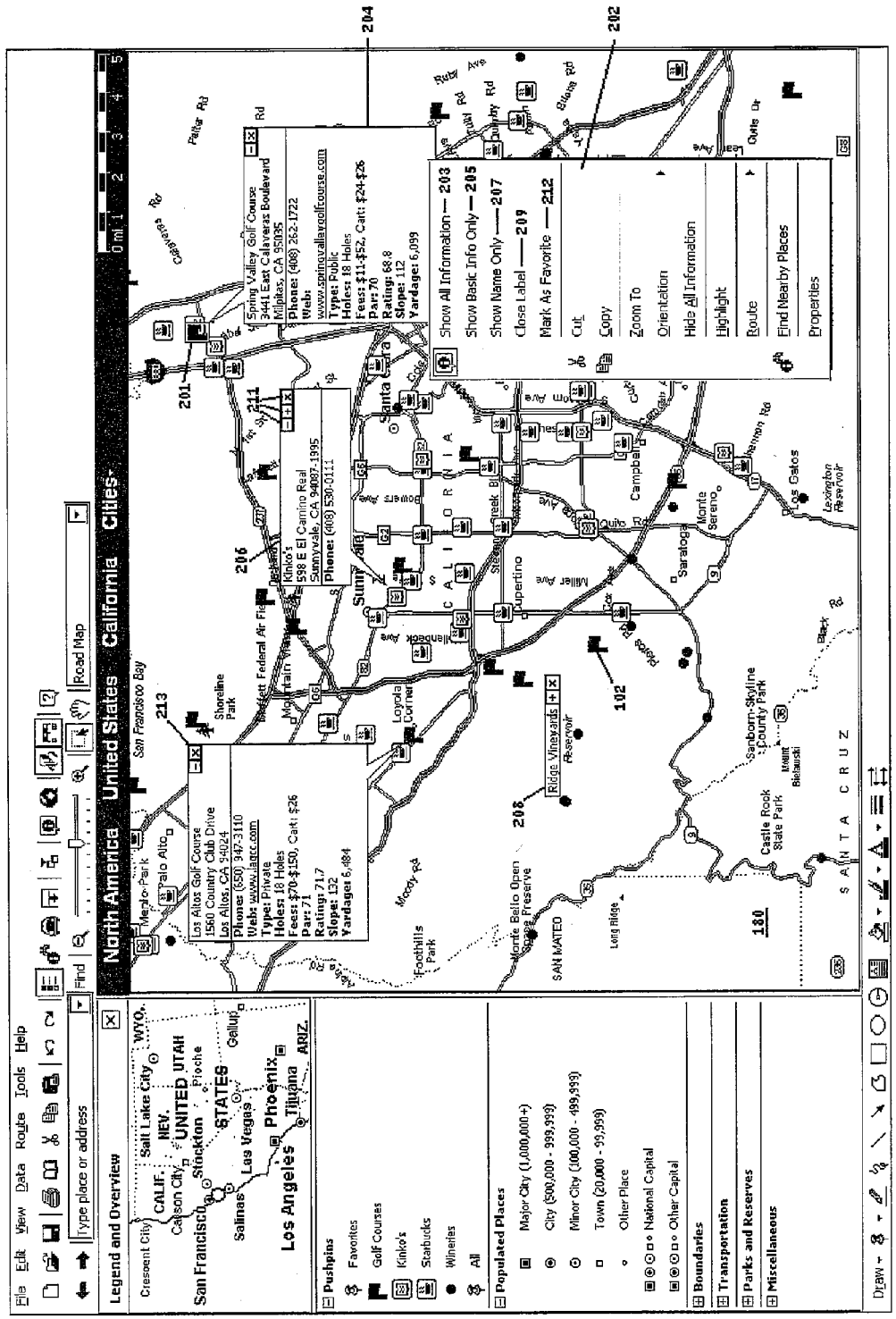
FIG. 2 shows the example map of FIG. 1 additionally showing example options for selecting the level of display and the amount of information displayed for one point of interest.

FIG. 2 shows how the amount of information displayed for any point of interest can be altered. In this example, right clicking on the Spring Valley Golf Course icon 201 causes the program to display a menu of commands or functions 202 which can be performed on the selected point of interest. Thus the user can set each point of interest to display different levels of information about that point of interest. The highest level is set using the Show All Information command 203, and causes all available data 204 for the point of interest to be displayed.

The next level of display is selected with the Show Basic Info Only command 205. This sets the point of interest to display the name, address and phone number, as shown in the Kinko's information balloon 206. The lowest information display level only shows the name of the point of interest, which is set using the Show Name Only command 207. For example, the Ridge Vineyards label 208 is an example of a point of interest for which Show Name Only has been set. A Close Label command 209 suppresses display of the information box completely, so that only an icon is displayed, as in the example of golf course icon 102. The foregoing are merely examples of information display levels that may be provided for qualitative information shown in association with point of interest icons. In other embodiments, other different levels of information display may be provided with other commands.

In one embodiment, controls to perform the foregoing functions, to increase or decrease the information display level, or to close the information box, also appear in the upper right hand corner of each information display box, as shown by controls 213. In one embodiment, [–], [+], and [X] controls 211 are used respectively to decrease the information display level, increase the information display level, or close the qualitative information display box, respectively. Once these levels are set, the information and POI icons displayed are unaffected by the current zoom level of the map 180. Thus, depending on the number of points of interest for which qualitative information is shown, information box overlapping may occur. However, selecting any portion of any information box 204 or label 208 causes the program to bring that box or label to the front or top layer of the map. As the map is zoomed in or out, the size of the icon and the size of the information box (font size) may be appropriately changed, but the information box remains viewable and discernable.

FIG. 2 also shows a Mark As Favorite command 212. With this command, the user can identify and select specific points of interest for special treatment, which are explained later in the description herein with reference to FIG. 5.

Figure 3:
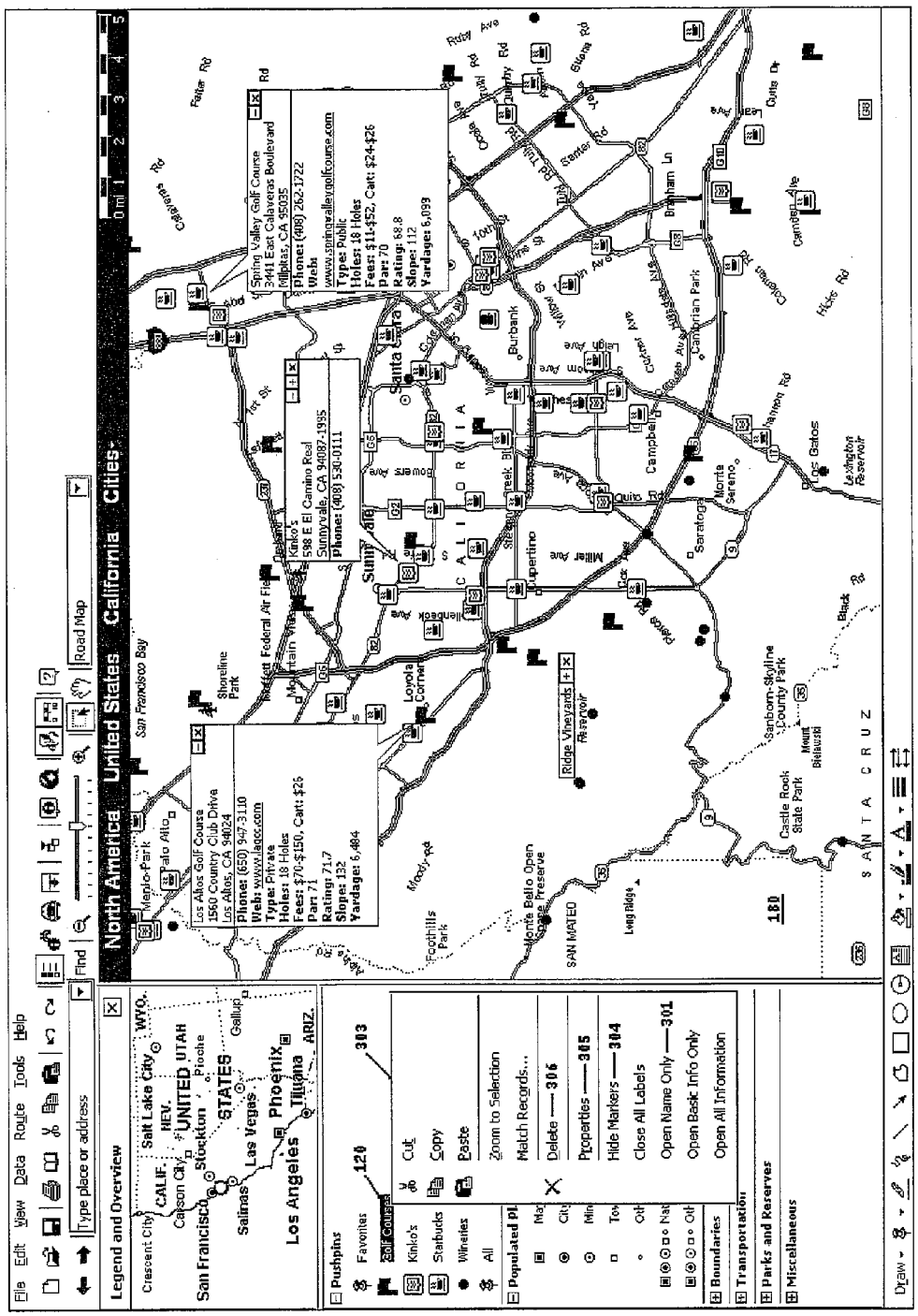
FIG. 3 shows the example map of FIG. 1 further showing example options for selecting the level of display and the amount of information displayed, enacted en masse for all of one type of point of interest.

In FIG. 3, it is shown how the amount of information or information level for an entire set of points of interest can be set en masse, in a similar fashion to that described with FIG. 2. As an example, the result of selecting an Open Name Only command 301 for the Golf Course data set 120 is shown is FIG. 4. The information display level of "name only" is applied to all points of interest in the Golf Course data set 120. In contrast, to accomplish an equivalent form of label setting in an existing mapping program would require a user to select each point of interest icon 102 individually, one at a time.

The command set 303 shown in FIG. 3 further includes an additional Hide Markers command 304. With the Hide Markers command 304, the user can remove a set of point of interest icons from appearing on the map 180. For example, selecting the Golf Courses data set 120 and then selecting the Hide Markers command 304 causes the program to re-display map 180 without point of interest icons for golf courses.

A Properties command 305 allows customization of dataset elements. In one embodiment, two dataset property customization functions include selecting an icon or map symbol for use with all points of interest in the dataset, and selecting which data fields are displayed when the highest or "All Information" level of qualitative information display is set. As more information is displayed, and the information box becomes larger, it may be desirable to temporarily remove some of the data fields from being shown.

Figure 4:
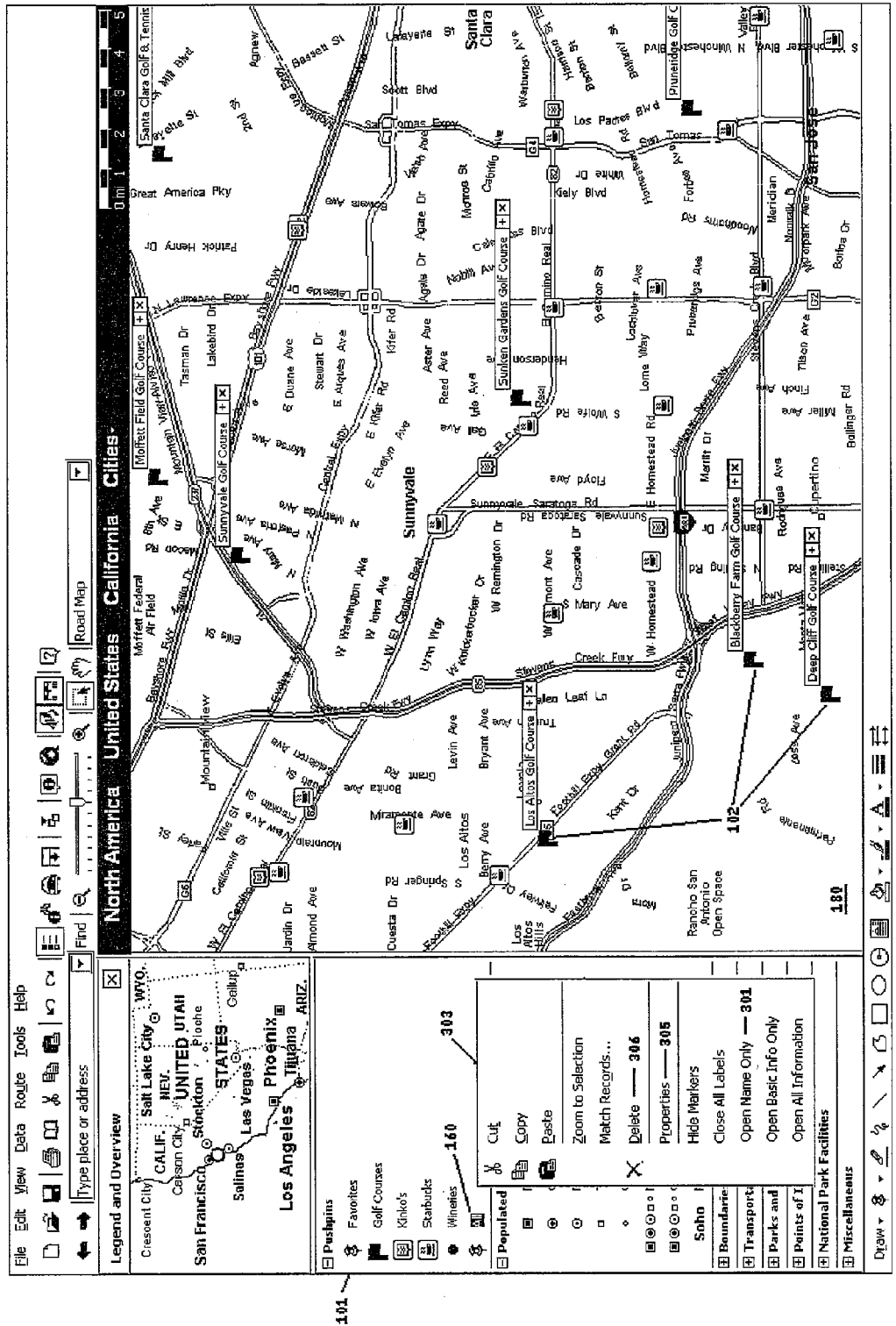
FIG. 4 shows the example map of FIG. 1 further showing example options for selecting a level of display and the amount of information displayed, enacted en masse for all points of interest.

Referring now to FIG. 4, in one embodiment, a dataset list 101 may include an All selection 160. With this selection, the information display functions 303 described above with respect to FIG. 3 can be enacted against all datasets at the same time, in a similar fashion to that described with FIG. 3. The use of the All selection 160 provides a time-saving function.

Figure 5:
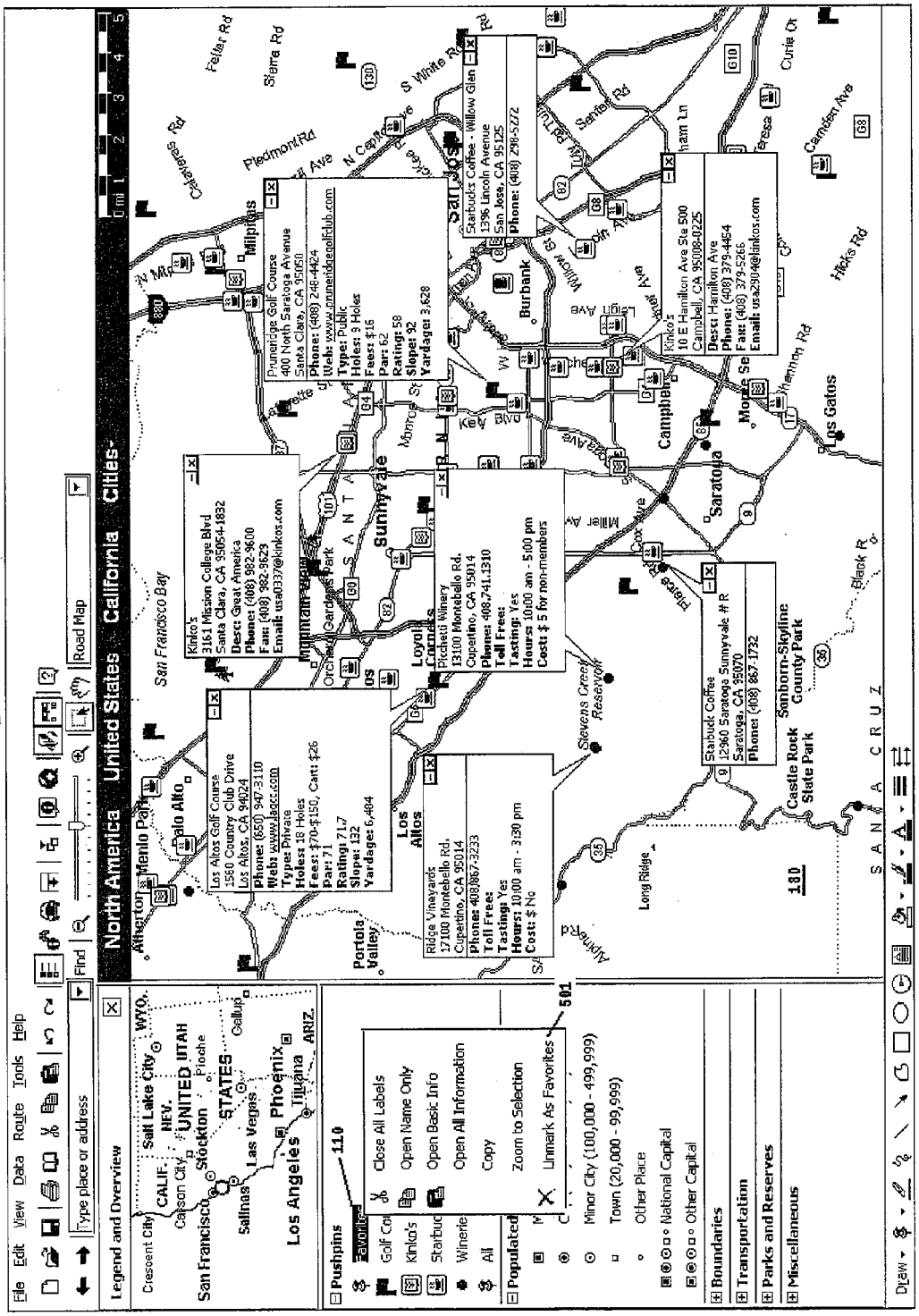
FIG. 5 shows the example map of FIG. 1 further showing example options for selecting the level of display and the amount of information displayed, enacted on all points of interest which are marked as "favorites."

FIG. 5 shows a data set labeled as a Favorites dataset 110. In one embodiment, a Favorites dataset 110 is made up of independent points of interest that are individually marked and selected by the user as preferred, special or unique, using the Mark As Favorite command 212 described above with reference to FIG. 2. This allows the user to quickly display or change the display of all the points of interest which were previously determined as interesting, without having to look for those points of interest.

FIG. 5 also shows an Unmark As Favorites command 501 which, when selected by a user, removes all previously selected favorite points of interest from the Favorites dataset 110. The Delete command 306 (FIG. 3, FIG. 4), when used against a specific data set, does not delete any data records relating to points of interest that have been marked as favorite. In various embodiments, data records that are marked as Favorites can either maintain a dual association with the original data set, or be duplicated.

Figure 6:
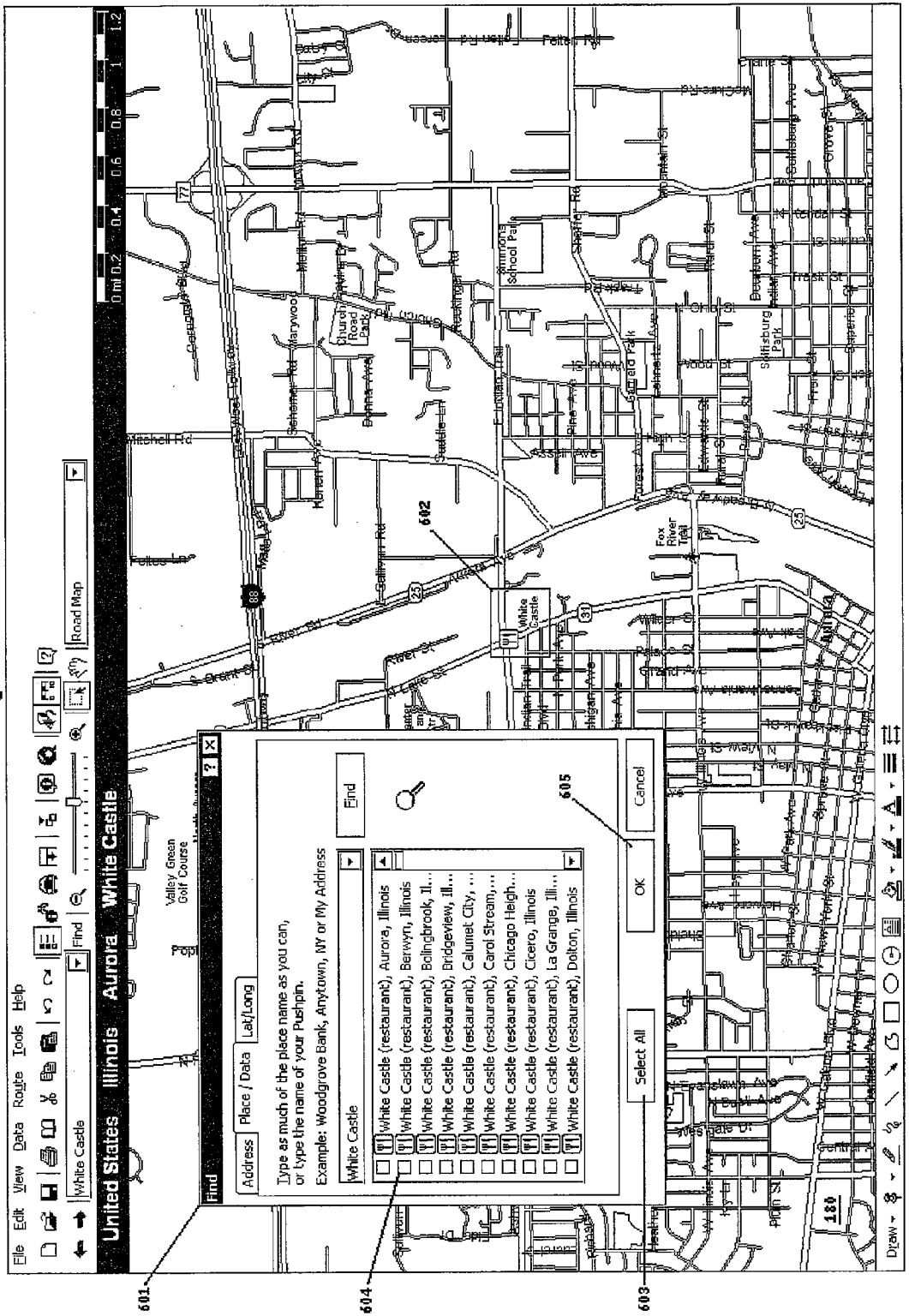
FIG. 6 shows the example map of FIG. 1 further showing additional, improved controls for a search results listing.

FIG. 6 shows the results of a search for White Castle restaurant locations in a Find dialog box 601. In past systems, a user can make only one selection at a time, and determine the location of only one location, such as restaurant location 602. According to an embodiment, any number of listings that appear in search results may be selected and assigned to a new dataset. In one embodiment, a Select All command 603 in the Find dialog box 601 and the individual selection boxes 604 to the left of each listing are used to select the listings to be imported into the new data set. For example, individual search results may be selected by selecting the selection boxes 604 associated with the search results, or all the search results may be selected with the Select All command 603.

Figure 7:
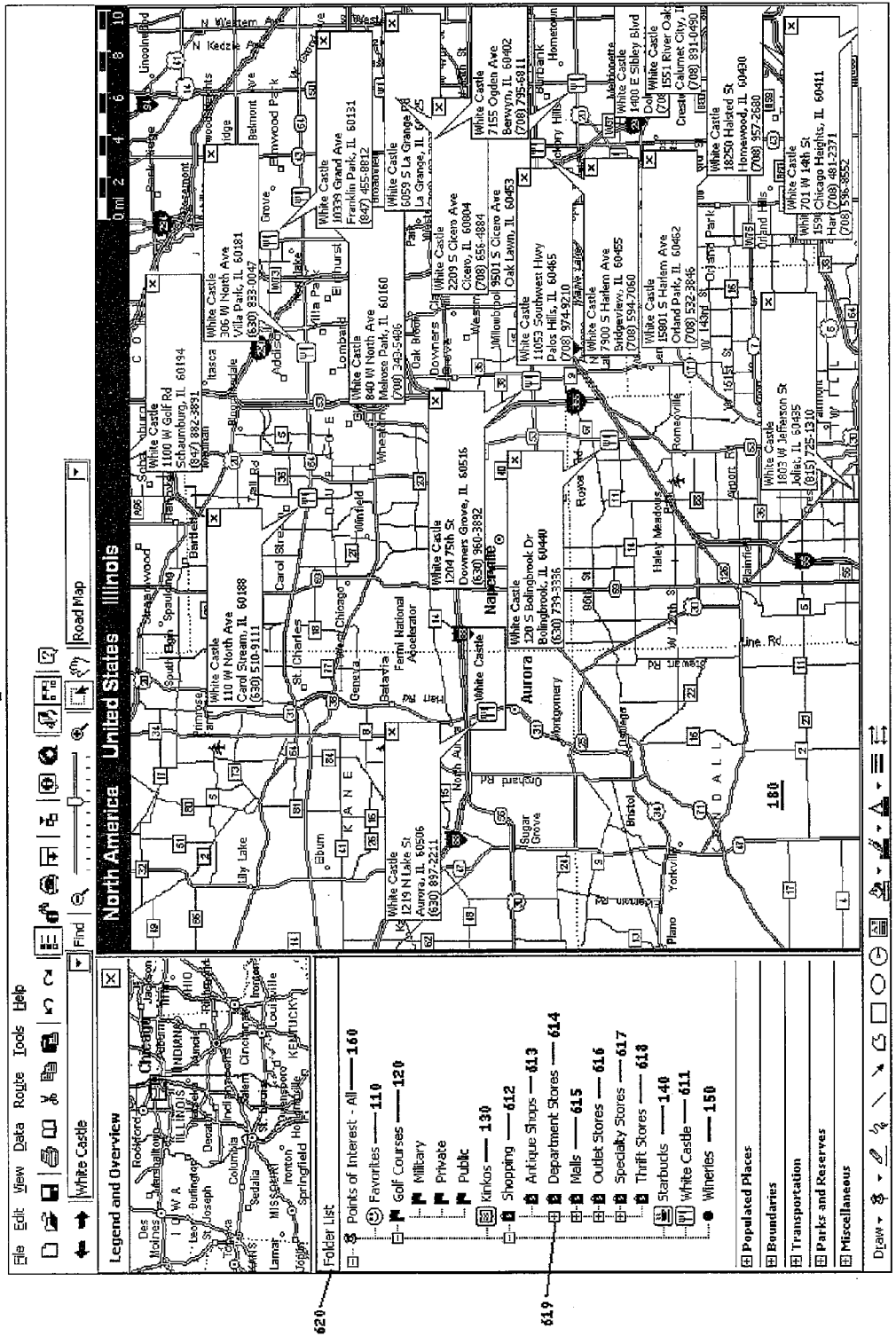
FIG. 7 shows the example map of FIG. 1 with use of a folder list system for organizing datasets into subsets.

When the OK button 605 of the dialog box 601 is selected, all the selected points of interest are shown on the map 180 at the same time, as shown in FIG. 7, and are automatically stored in a new dataset 611 having a name corresponding to the search query of dialog box 601. The new data set 611 may be kept, with the inapplicable listings either being ignored or deleted later. If the user intended to locate only one most appropriate or desirable listing, then once that listing is found, the listing can be added to the Favorite dataset 110, and the rest of the newly created dataset 611 may be deleted. Using this approach, a user can view candidate points of interest in a map view and then save points of geographical interest in a dataset. It is much more effective to view all the potential candidates for analysis on the map, rather than in a long list column of search results, which in various systems might be sorted in a variety of ways, e.g., alphabetically, by distance, by category, etc.

The methods of providing enhanced information for points of interest in a map, as taught above, can be applied to any number of places or points of interest. Any form of qualitative information may be provided. For example, restaurants could have travel guide ratings and price ranges, antique shops could include a description of the type of antiques carried or specialized in, or and shopping malls could include a listing of the major anchor stores.

In addition, a dataset can be made up of a number of datasets, as subsets, just as a folder can contain other folders. For example, as shown in FIG. 7, a Shopping dataset 612 might include Malls 615, Outlet Stores 616, Antique Shops 613, Thrift Stores 618, Specialty Stores 617, Department Stores 614, etc., each organized as an independent dataset that can be independently selected or acted upon. The relationship between the subset and the main dataset is analogous to the relationship between the All dataset 160 and individual datasets, such as the Golf Course dataset 120, Kinko's dataset 130, Starbuck's dataset 440 and Wineries dataset 150. As an example, these four data sets could be combined under a Traveler's Information dataset heading. The structure of the datasets may model that of a folder system 620, where clicking on a [+] symbol 619 in front of the dataset, opens a view into the subsets.

The techniques described herein may be implemented, for example, in an improved travel or mapping program in which supplemental, qualitative POI information is effectively integrated into a map program. This information satisfies the logical level of desired knowledge about any POI, without having to perform another search or go to another source of information. Such a mapping program may serve as an effective base for an information delivery system, and is especially useful for delivering types of information found in travel guides.

The supplemental information associated with each type of point of interest (POI), can be unique to the POI, and need not be limited, or standard across all data sets. A method of quickly and effectively locating points of interest within a map area is provided, and does not require low level zooming, or using a search or find command. Improved methods of capturing points of interest when using search or find commands are described. Methods of marking preferred points of interest as favorites, and treating them independently, have been shown.

3.0 Implementation Mechanisms—Hardware Overview

Figure 8:
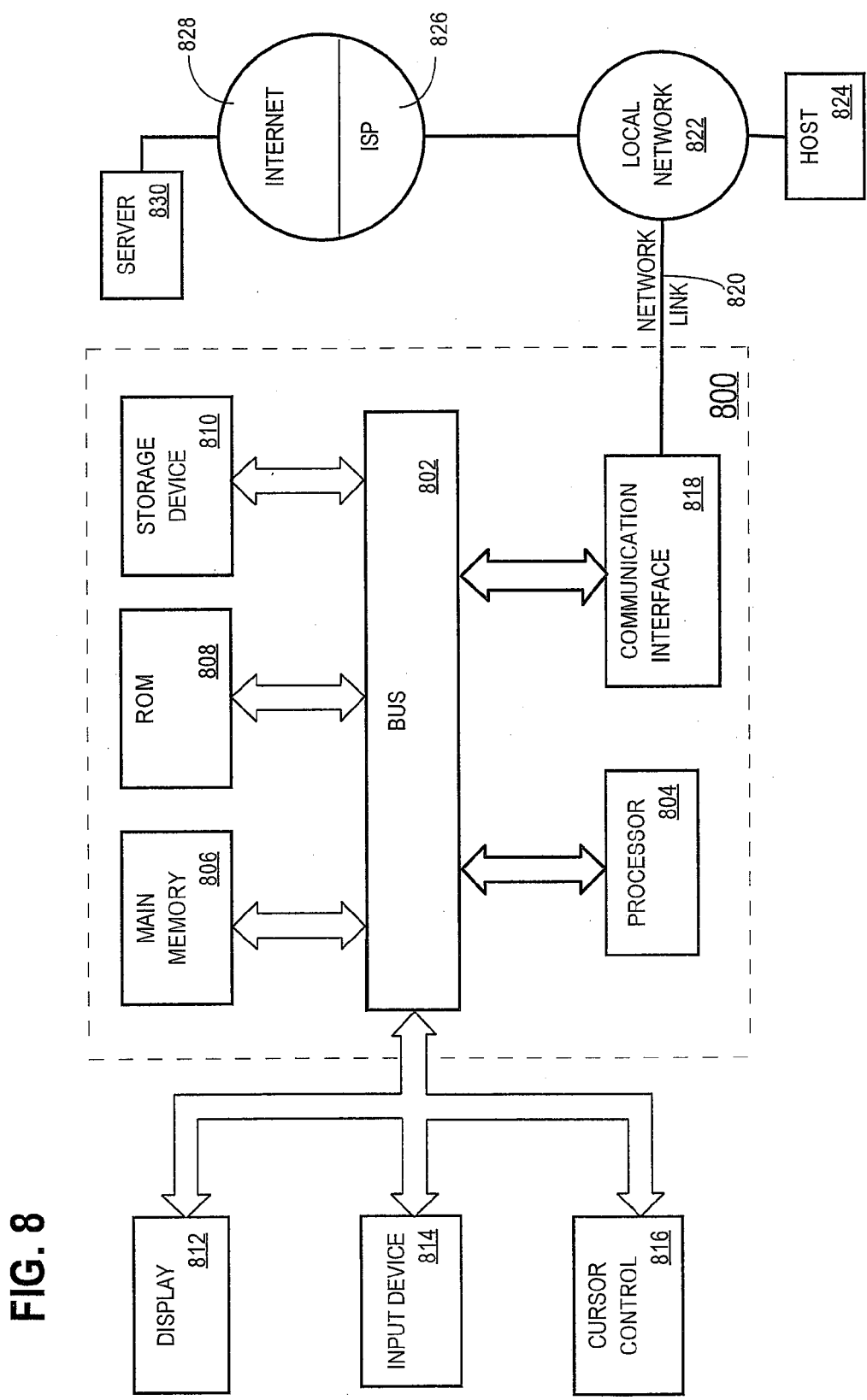
FIG. 8 is a block diagram that illustrates a computer system upon which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory ("RAM") or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory ("ROM") 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube ("CRT"), for displaying information to a computer user. An input device 814, including alphanumeric and other keys, is coupled to bus 802 for communicating information and command selections to processor 804. Another type of user input device is cursor control 816, such as a mouse, trackball, stylus, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for displaying points of interest with qualitative information. According to one embodiment of the invention, displaying points of interest with qualitative information is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network ("ISDN") card or a modem to provide a data communication connection to a corresponding type of telephone line. As another example, communication interface 818 may be a local area network ("LAN") card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider ("ISP") 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for displaying points of interest with qualitative information as described herein.

The received code may be executed by processor 804 as it is received, and/or stored in storage device 810, or other non-volatile storage for later execution. In this manner, computer system 800 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising the computer-implemented steps of:
   displaying a geographical map;
   displaying in the map, concurrently, icons identifying two or more points of interest at graphical locations in the map corresponding to geographical locations of the points of interest;
   concurrently displaying, over the map, for each of the two or more points of interest at different geographical locations, particular qualitative information associated with the associated point of interest;
   wherein all the qualitative information for all the points of interest is concurrently displayed in the map;
   displaying, over the map, for each of the points of interest, an information box comprising the qualitative information for the associated point of interest, a first control which when selected causes displaying a higher level of information in the information box, and a second control which when selected causes displaying a lower level of information in the information box;
   wherein each of the points of interest is associated with one or more datasets, and
   wherein different qualitative information is displayed for different datasets.

2. A method as recited in claim 1, further comprising the steps of:
   receiving user input in association with a selected one of the points of interest, wherein the user input indicates a selection of one of a plurality of levels of information to display with the selected point of interest, wherein one of the levels of information comprises the qualitative information;
   wherein each of the levels of information comprises at least a portion of the qualitative information about a point of interest;
   in response to receiving the user input, re-displaying a different level of information in association with the selected point of interest, wherein the level corresponds to the selection.

3. A method as recited in claim 2, wherein the plurality of levels comprises all information including qualitative information, basic information only, and name only.

4. A method as recited in claim 1, further comprising the steps of:
   associating a category name with a sub-set of the points of interest;
   receiving user input in association with the category name, wherein the user input indicates a selection of one of a plurality of levels of information to display with all points of interest in the subset;

wherein each of the levels of information comprises at least a portion of the qualitative information about a point of interest;

in response to receiving the user input, re-displaying a different level of information in association with all points of interest in the subset, wherein the level corresponds to the selection.

5. A method as recited in claim 1, wherein the qualitative information comprises any information, other than name, address or location, telephone number, and type of point of interest, that is useful to a user in determining whether to visit the point of interest, patronize the point of interest, or compare the point of interest to other similar points of interest.

6. A method as recited in claim 4, wherein the category name identifies all the points of interest, and wherein the sub-set comprises all the points of interest.

7. A method as recited in claim 4, wherein a plurality of category names are organized and displayed in a hierarchical list of folders.

8. A method as recited in claim 4, further comprising the step of receiving user input selecting a category name from a hierarchical list of category names.

9. A method as recited in claim 7, further comprising the steps of:

creating and storing a list of user favorite points of interest;

receiving user input identifying a particular point of interest as a user favorite;

associating the particular point of interest with the list of user favorite points of interest;

associating a favorites category name with the user favorite points of interest;

receiving user input in association with the favorites category name, wherein the user input indicates a selection of one of a plurality of levels of information to display with all of the user favorite points of interest;

in response to receiving the user input, re-displaying a different level of information in association with all the user favorite points of interest, wherein the level corresponds to the selection.

10. A method as recited in claim 9, further comprising the steps of:

associating a favorites category name with the user favorite points of interest;

receiving user input in association with the favorites category name, wherein the user input requests discontinuing display of all the user favorite points of interest;

in response to receiving the user input, re-displaying the map without all the user favorite points of interest.

11. A method as recited in claim 9, further comprising the steps of re-displaying the map and displaying only the user favorite points of interest in the map.

12. A method as recited in claim 1, further comprising the steps of:

receiving a search query;

generating and displaying a result list of points of interest in response the search query;

receiving user input identifying two or more selected points of interest that are selected from among the points of interest in the result list; and re-displaying the map, including concurrently displaying in the map all of the selected points of interest identified by the user input.

13. A method as recited in claim 12, further comprising the steps of creating and storing a dataset that contains the one or more selected points of interest, assigning a name to the dataset according to the search query, and displaying the name of the dataset in a hierarchical list of datasets.

14. A method as recited in claim 1, wherein the qualitative information comprises any one or more of: ratings of users, reviewers, or media, pricing information, hours of operation, or hyperlinks to network resources associated with the points of interest.

15. A method as recited in claim 1, wherein the qualitative information is displayed in an overlay balloon that provides qualitative information associated with the associated point of interest;

comprising displaying a graphical connection between the overlay balloon and the associated point of interest.

16. A method as recited in claim 1, wherein the steps are performed as part of a travel or business mapping computer program.

17. A computer-readable tangible storage medium comprising one or more sequences of instructions which, when executed by one or more processors, cause the one or more processors to perform the steps of:

displaying a geographical map;

displaying in the map, concurrently, icons identifying two or more points of interest at graphical locations in the map corresponding to geographical locations of the points of interest;

concurrently displaying, over the map, for each of the two or more points of interest at different geographical locations, particular qualitative information associated with the associated point of interest;

wherein all the qualitative information for all the points of interest is concurrently displayed in the map;

displaying, over the map, for each of the points of interest, an information box comprising the qualitative information for the associated point of interest, a first control which when selected causes displaying a higher level of information in the information box, and a second control which when selected causes displaying a lower level of information in the information box;

wherein each of the points of interest is associated with one or more datasets, and wherein different qualitative information is displayed for different datasets.

18. An apparatus, comprising:

means for displaying a geographical map;

means for displaying, in the map, concurrently, icons identifying two or more points of interest at graphical locations in the map corresponding to geographical locations of the points of interest;

means for concurrently displaying, over the map, for each of the two or more points of interest at different geographical locations, particular qualitative information associated with the associated point of interest;

wherein all the qualitative information for all the points of interest is concurrently displayed in the map;

means for displaying, over the map, for each of the points of interest, an information box comprising the qualitative information for the associated point of interest, a first control which when selected causes displaying a higher level of information in the information box, and a second control which when selected causes displaying a lower level of information in the information box;

wherein each of the points of interest is associated with one or more datasets, and wherein different qualitative information is displayed for different datasets.

19. The method of claim 1, further comprising concurrently displaying, over the map, for each of the two or more points of interest at different geographical locations, a graphical connection between the particular qualitative information and the associated point of interest.

20. The apparatus of claim 18, further comprising:
means for receiving user input in association with a selected one of the points of interest, wherein the user input indicates a selection of one of a plurality of levels of information to display with the selected point of interest, wherein one of the levels of information comprises the qualitative information; wherein each of the levels of information comprises at least a portion of the qualitative information about a point of interest;

means for re-displaying, in response to receiving the user input, a different level of information in association with the selected point of interest, wherein the level corresponds to the selection.

\* \* \* \* \*